July 28, 1970  EIZO GOTO  3,522,028
METHOD OF BONDING PARTS TOGETHER BY MEANS
OF A MOLTEN GLASS COMPOSITION
Filed Feb. 15, 1967  3 Sheets-Sheet 1

INVENTOR.
Eizo Goto
BY George B. Oujevolk
Attorney

July 28, 1970  EIZO GOTO  3,522,028
METHOD OF BONDING PARTS TOGETHER BY MEANS
OF A MOLTEN GLASS COMPOSITION
Filed Feb. 15, 1967  3 Sheets-Sheet 3

BY Eizo Goto
INVENTOR.

George B. Auzerolli
Attorney.

ＵnitedＳtatesＰatentＯffice 3,522,028
Patented July 28, 1970

3,522,028
METHOD OF BONDING PARTS TOGETHER BY MEANS OF A MOLTEN GLASS COMPOSITION
Eizo Goto, Chigasaki-shi, Japan, assignor to Tokyo Shibaura Electric Co., Ltd., Kawasaki-shi, Japan, a corporation of Japan
Filed Feb. 15, 1967, Ser. No. 616,390
Claims priority, application Japan, Feb. 18, 1966, 41/9,824; Feb. 28, 1966, 41/12,164; Oct. 8, 1966, 41/66,029
Int. Cl. C03b 23/20, 27/04; C03c 29/00
U.S. Cl. 65—40                                                5 Claims

ABSTRACT OF THE DISCLOSURE

A method of bonding parts together by means of a molten glass composition wherein a pool of molten glass is formed and its surface layer is heated so that the layer has a viscosity of less than 100 poises. This heating is accomplished by passing an electric current through the layer between two electrodes disposed in the surface layer. Parts of members to be joined are immersed in the surface layer between the electrodes so that electric current passes thru them in an amount sufficient to heat the parts so that there is no local drop in temperature of the molten composition adjacent the immersed parts. Heating is continued for a time sufficient to cause adherence of the molten glass to the parts to bond them together. The parts are then withdrawn while passing current through them in an amount sufficient to reduce the viscosity of the portion of molten glass which has been suspended so as to separate it from the parent body of molten glass.

RELATED PATENT

The process of immersing component parts to be united in the body of molten composition according to the present invention utilizes the step described in the U.S. patent application Ser. No. 538,379 and now abandoned.

BACKGROUND OF THIS INVENTION

The present invention relates to joining together parts of similar or dissimilar materials by immersing edges of the parts to be united in contact with or in a close proximity to each other in a body of molten glass, drawing up the immersed edges of the parts after an appropriate interval of time, so as to cause the adherence of molten glass to the immersed edges to bond them together.

To weld the face plate and the tube funnel of a Braun tube, it is the general practice to preheat the peripheral edges of the glass parts by burner electrodes to a temperature sufficient for permitting current to flow through the heated portions of these parts. Thus, the conductivity of glass is increased with temperature rise to supply electrical current concurrently to the preheated peripheral edges of the glass parts by impressing a voltage across said burner electrodes to fuse the peripheral edges by Joule heat generated. This further increases the heating temperature of the peripheral edges, pushing together peripheral edges, so as to fuse the face plate and the tube funnel together.

The preheating of the peripheral edges of the face plate and the tube funnel to increase the conductivity, however, takes a considerably long time and lengthens the entire welding process causing a disadvantage. Also, the use of burner electrodes results in unstable shaky current, which causes chipping or fracturing of the parts in the subsequent immersing operation.

Also, the current through the flame of the gas burner presents a large voltage drop, which dictates a very high voltage to be applied across the burner electrodes to generate a sufficient amount of Joule heat in the portions to be joined together, which consequently requires transformers and various associated equipment. Further, in the case of joining glass to metal parts, for instance, sealing the front lens to the metal reflector of the sealed beam lamp, current flows only through the metallic part with negligible current through the glass part, so that the glass part cannot be heated sufficient to achieve fusion welding.

An alternative prior art method for joining metal to metal, ceramic member to ceramic member and glass to glass, or joining together at least two of the metal, ceramic and glass parts into composite units is what is usually termed "dipping-in-glass" method where portions to be welded together are immersed in contact with or in close proximity to one another in a body of molten glass.

One of the problems encountered in this method is that when the parts to be united together are immersed in a molten glass body the temperature of the portions of molten glass adjacent the immersed edges is reduced due to heat absorption of the immersed edges, the effects being particularly conspicuous when the parts to be immersed are composed of materials having large heat capacity and large in size of the portions to be welded thus increasing the viscosity of the portions of molten glass adjacent the immersed edges to spoil convenient adherence of molten glass. Consequently, molten glass does not part well at the line of drawing up immersed edges and also the adherence of molten glass to the immersed portions is not so good as desired. Further, in case parts to be joined together are glass parts, the prolonging of the immersing time to obtain sufficient adherence tends to cause fusion and deformation of the portions to be bonded together.

Although it is usual to preheat the portions to be joined together by gas flame and like means to achieve sufficient adherence of molten glass with a sufficiently shortened immersing time, to do so not only requires excess time for preheating but also a special means is required for preventing oxidization of the parts, when easily oxidizable parts such as metal parts are involved, for instance, preheating and immersing should be made within an inactive gas atmosphere.

SUMMARY

According to the present invention there is provided an improved method of joining component parts to each other, whereby a satisfactory adhesion of binding medium is effected in a shorter immersion time than heretofore to ensure a satisfactory soldering.

In order to attain the results required, the body of the molten composition is preheated so that the viscosity of the upper treatment layer of the body of the molten composition is maintained below 100 poises, preferably between 100 and 50 poises. The parts to be joined together are then immersed in contact with or in close proximity to each other in the body of the molten composition, while passing current through said upper treatment layer of the body of the molten composition, so that the immersed portions of the parts may be drawn up in a shorter time than otherwise.

As the current through the body of the molten composition assists in heating portions of the parts immersed therein, local temperature drop of the molten composition adjacent the immersed portions of the parts is prevented to accelerate wetting effect to permit drawing up the immersed parts in a shorter time.

IN THE DRAWINGS

DETAILED DESCRIPTION

The soldering method according to this invention may be employed for joining together component parts of materials having coefficients of expansion differing from the coefficient of expansion of the molten vitreous bonding composition to such an extent that the application of the molten composition to the component parts will cause breakage to the latter. It may be used for bonding either parts of similar material, such as glass to glass, ceramic to ceramic, metal to metal, etc., or any combination of these materials. It also enables uniting more than two parts at one time.

Figure 1:
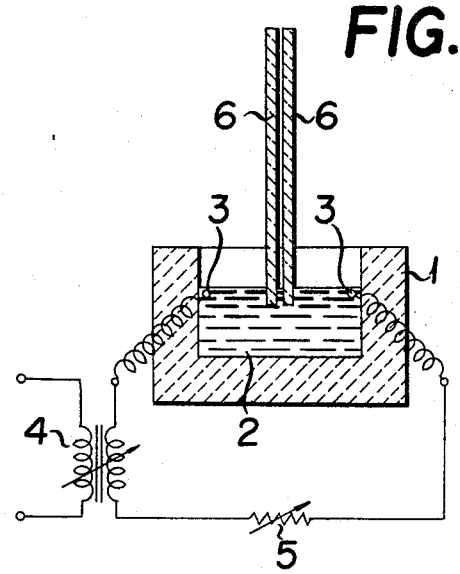
FIG. 1 is a sectional diagram showing a preferred mode of the bonding or soldering method according to the invention.

Referring now to the drawings, and particularly to FIG. 1 which represents an exemplary arrangement for carrying out the invention, in a crucible 1 is contained a body 2 of molten-low-melting vitreous composition having, for instance, a coefficient of linear expansion of $98 \times 10^{-7}$ cm./° C. in the temperature range between 100° C. and 300° C. and a melting temperature of 510° C. and maintained at a temperature of 1200 to 1300° C. so as to provide a viscosity of less than 100 poises (a viscosity range between 100 poises and 50 poises being preferred). The temperature at which above values of viscosity are attainable is different for different vitreous compositions; 1300° C. to 1400° C. for calcium lime glass and about 1600° C. for boron silicate glass.

Two parallel straight tungsten rods about 2 mm. in diameter and constituting terminal electrodes 3 are disposed in the exposed surface of the body 2 and spaced about 30 mm. from each other. Across the electrodes 3 is coupled a 50-cycle commercial AC source through a variable transformer 4 and a stabilizer 5.

The Joule heat generated by current through the molten composition available by applying AC source across the electrodes 3 may be utilized for heating the molten composition, besides the burner electrodes.

Two parallel glass plates to be joined to each other are immersed vertically to a depth of, for instance, 2 mm. in the body of molten vitreous composition. The glass plates 6 in this example are 2 mm. thick and have a linear expansion coefficient of $96 \times 10^{-7}$ cm./° C. in a temperature range between 100° C. and 300° C. and a melting temperature of 630° C. Though the glass plates 6 are shown to be slightly spaced apart, they may be in close contact with each other so as to utilize capillary action that will take place in the interface between the plates due to relatively low viscosity of the molten composition.

As the conductivity of the vitreous material is usually increased suddenly when its temperature exceeds 500° C., only a relatively low voltage is required to pass sufficient current between the electrodes 3 through the body of the molten composition whose temperature is elevated above 1000° C. at the time of immersion of the glass plates 6 therein.

By first applying an AC voltage of 260 volts to the electrodes, current through the body of the molten composition starts to concentrate in the surface layer and after three minutes a current of 4 amperes per 1 cm. of the electrode is obtained by the applied voltage of 48 volts.

The glass plates 6 are heated by Joule heat of the current through the molten composition, so that there is no decrease in temperature in the molten composition in the vicinity of the immersed portions of the parts to be joined together and the immersed portions are rapidly wetted and can be drawn up immediately after the immersion.

Figure 2:
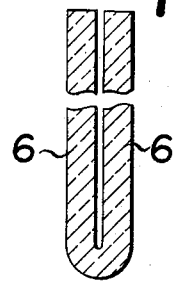
FIG. 2 is a section, partly broken away, of a joint obtained by the soldering method according to the invention.

In case of the glass plates having a thickness of 2 mm. the edges are completely bonded together as shown in FIG. 2 after the immersion of about 2 seconds.

Figure 3:
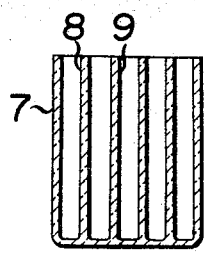
FIG. 3 is a section of another joint.
Figure 4:
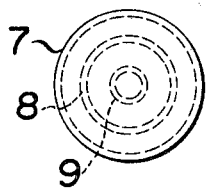
FIG. 4 is a plan view of the joint shown in FIG. 1.

What is called the pair glass plates may be obtained by carrying out the above bonding process over the entire periphery of the glass plates 6. The semi-product shown in FIGS. 3 and 4 is obtained by immersing a plurality of concentric hollow glass cylinders having different diameters in the molten composition.

When the immersing parts are composed of glass as in the above case, the temperature of the immersed portions is raised to above 500° C. so that current passes also through these portions to assist in temperature raise of those portions.

Figure 5:
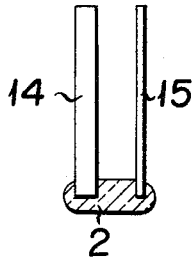
FIGS. 5 and 6 are sections of still further joints.
Figure 6:
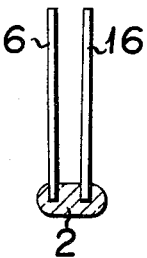

FIG. 5 shows a composite unit obtained by bonding a glass plate 14 having a thickness of 2 mm. to nickel-iron plate 15 having a thickness of 0.4 mm. by the immersing operation, and FIG. 6 shows another composite unit obtained by immersing two nickel-iron alloy plates 16.

Figure 7:
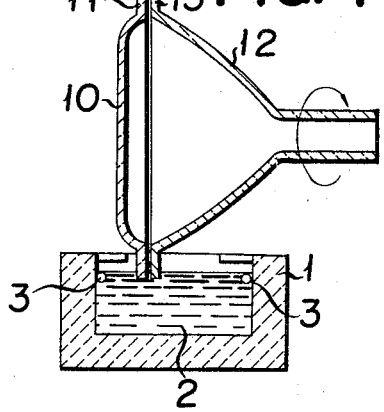
FIG. 7 is a sectional diagram illustrating sealing together of a Braun tube face plate and funnel.

FIG. 7 illustrates an application of the invention to the sealing of a Braun tube face plate 10 to the tube funnel 12 by putting together flanged portions 11 and 13 of both parts and progressively immersing the flanged portions in the molten composition through which a predetermined current is passed by constantly rotating the parts, and successively withdrawing the immersed portions from contact with the molten composition along the entire periphery of the parts. When the parts are rotated in a direction normal to the direction of the current, the immersed flanged portions are always brought into contact with the freshly heated molten composition, so that the immersed portions are not subjected to temperature decrease and the entire sealing time takes only 20 to 30 seconds.

As has been apparent from the foregoing description, the upper layer of the body of the molten composition immersed with parts to be joined together is heated by Joule heat of the current therethrough, so that if metal parts having a large heat capacity are immersed the adjacent molten composition is not subject to chilling effect, and satisfactory adherence of the molten composition is achieved during a short immersing time. The fact that the parts can be wetted in a shorter time is particularly suitable for soldering of parts having a deposited aluminum film and of parts having a shadow mask. These parts tend to be damaged by thermal effects during soldering or bonding by conventional method but, thermal effects are prevented when soldering treatment is made in a shorter time as according to the invention.

Figure 8A:
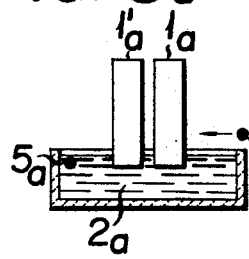
FIGS. 8a, 8b and 8c show an improved method of passing current through two glass parts to be joined together by immersing them in parallel proximity to each other in a body of molten vitreous composition and thus to facilitate separation of the molten composition at the time of drawing up the immersed parts.
Figure 8B:
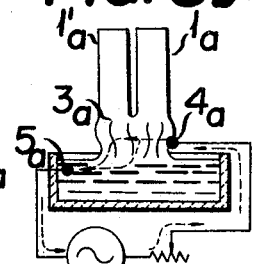
Figure 8C:
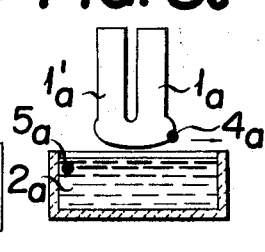
Figure 9A:
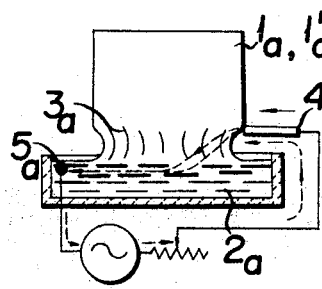
FIGS. 9a, 9b and 9c show another method of passing current through parts to be jointed together in a direction at right angles to the direction of current flow in FIGS. 8a, 8b and 8c.
Figure 9B:
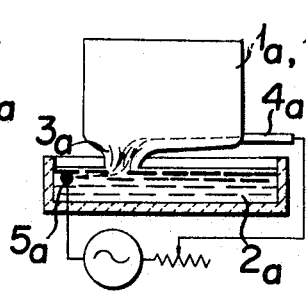
Figure 9C:
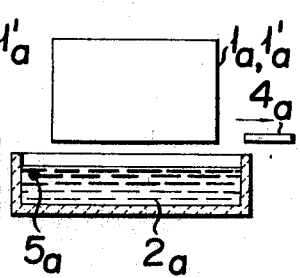
Figure 10A:
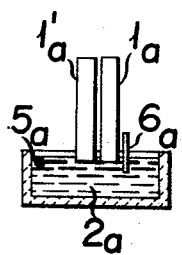
FIGS. 10a and 10b show soldering parts to be united together with one of the electrodes.
Figure 10B:
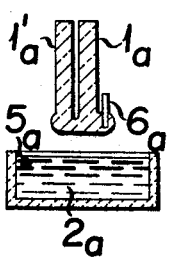

FIGS. 8a, 8b and 8c show another soldering or bonding method embodying the invention. Two plates of potassium soda lead glass (with coefficient of linear expansion being $96 \times 10^{-7}$ cm.°C. in a temperature range of 100 to 300° C. and melting temperature 630° C.) $1a$ and $1'a$ are immersed to body $2a$ of similar and relatively highly viscous vitreous composition (FIG. $8a$).

Two seconds afterwards the immersed plates are drawn up about 5 mm. above the initial exposed surface of the body of the molten composition, and the portion $3a$ of the molten composition suspending from the plates $1a$ and $1'a$ is contacted sidewise with an electrode $4a$ of about 2.5 mm. in diameter and made of such material as carbon, molybdenum, tungsten and the like, and a voltage of the order of several tens volts is applied between this electrode and an electrode $5a$ disposed in the body of the molten composition to cause current in the direction of arrow in FIG. $8b$ to heat the suspended portion $3a$, thereby reducing the viscosity of the heated portion. The separation of the suspended portion from the parent body of the molten composition as shown in FIG. $8c$ is effected about in one minute. In this embodiment the electrode $4a$ of a carbon wire may first be disposed in the surface of the bath of the molten composition and then may be withdrawn from the bath while contacting the portions to be joined. The electrode $5a$ may constitute one of the electrodes for passing current through the body of the molten composition in the embodiments shown in FIGS. 1 to 7, flowing in an area substantially parallel with the exposed surfaces of the body of the molten composition. In such cases the results obtained will be better than those obtainable by merely passing current between fixed electrodes.

FIGS. $9a$, $9b$ and $9c$ show applying the electrode $4a$ edgewise to the suspended portion 3, whereby current flows along the length of the edge of the glass plate $1a$. As the most of the current flows through portions offering minimum resistance, that is through portions at highest temperatures, a current path as shown by the arrow in FIG. $9a$ is established, and the suspended portion progressively separates from the side of the electrode 4 proceeding through a state as shown in FIG. $9b$ to finally complete clear separation as shown in FIG. $9c$. In this case the electrode $4a$ can be more easily removed from the finished article than for the case shown in FIGS. $8a$, $8b$ and $8c$.

FIGS. $10a$ and $10b$ show a further embodiment similar to the preceding two embodiments except that the electrode $4a$ is replaced by a strip or plate of nickel-iron alloy $6a$ which remains with the bonded glass plates. Usually such metal part may be a portion of a conducting lead brought outside of the tube.

Figure 11:
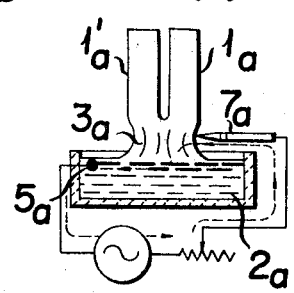
FIGS. 11 and 12 show further embodiments for obtaining a better separation of the molten composition coated to the part from the bath.

FIG. 11 shows the use of burner electrode $7a$ replacing the electrode $4a$, which is particularly suitable for the treatment of small-sized parts, as there is no use for bringing the electrode into contact with the glass parts to be joined together, while the passage of current and the separation of the suspended portion $3a$ of the molten vitreous composition are substantially the same as for the previous two embodiments.

Figure 12:
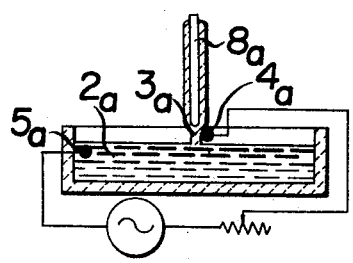

FIG. 12 shows enclosing a metal wire $8a$ in an insulating cover, whereby a better separation of the applied portion of the molten composition may be obtained by the passage of current.

The idea of utilizing the effects of current passage for enhancing the separation of the coated molten composition is derived from the concept of maintaining the viscosity of the upper layer of the body of the molten composition at a predetermined value by passing current through the upper layer of the molten composition as is described in connection with FIGS. 1 to 7, and it enables not only improving the soldering process shown in FIGS. 1 to 7, but also it is an effective procedure for separating the coated molten composition in itself. This procedure is particularly effective in eliminating problems encountered heretofore in the separation of the coated molten composition when high-melting glass parts are involved.

Figure 13:
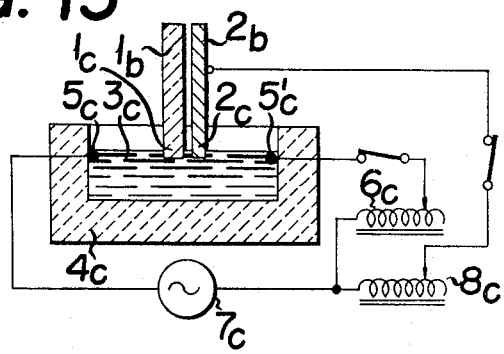
FIG. 13 shows a still further embodiment of the improved method of passing current through the parts to be joined together, one of the parts being a metal part.
Figure 14:
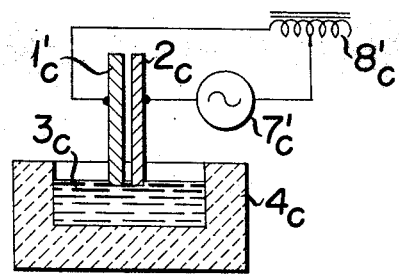
FIG. 14 shows a further embodiment of passing current through the parts to be joined together, both of which are metal parts.

In the embodiments shown in FIGS. 13 and 14, at least one of the component parts to be united, a metal part, also serves as one of the electrodes for passing current through the body of the molten composition. FIG. 13 shows joining a glass part $1b$ to a metal part $2b$.

In FIG. 13 a crucible $4c$ contains a body $3c$ of molten vitreous composition. In the crucible $4c$ is disposed a pair of electrodes $5c$ and $5'c$ across which is coupled an AC source $7b$ through a variable reactor $6c$ so as to provide current through the molten composition to maintain the composition in a predetermined molten state. The edge portions $1c$ and $2c$ to be united together of two parts, one being a glass part $1b$ and the other a metal part $2b$, are immersed in the body $3c$ of the molten composition, and at the same time another AC source $7c$ is coupled between one electrode $5c$ and the metal part $2b$ through another variable reactor $8c$. Thus, the metal part $2b$ acts as one electrode, which together with the electrode $5c$ causes current which assists in heating the molten composition. Since the current considerably concentrates in the vicinity of the immersed portion of the metal part, the immersed portion is sufficiently heated, to the result that the satisfactory soldering is secured in a shorter time.

In the example of FIG. 13, the part $1b$ was of 2.5 mm. thick soda lime glass plate and the part $2b$ was of 1.0 mm. thick nickel-iron alloy plate, while the molten vitreous composition was heated by current therethrough between the electrodes $5c$ and $5'c$ 2.5 cm. spaced apart from each other, each having a length of 2.5 cm., under specified conditions of current of 10 amperes with applied voltage of 50 volts.

Without application of a voltage to the part $2b$, the soldering process took more than 5 seconds and resulted in insufficient adherence of molten composition to the portions to be welded together. On the other hand with a voltage of 50 volts applied between the part $2b$ and the other electrode $5'c$, the bonding, i.e., soldering was completed by immersing the parts only one minute with a satisfactory adherence of the molten composition to the parts.

It is preferable to adjust the current density to a suitable value, since excessive current will cause damage to the parts to be united due to excessive heating. Usually a current density of 3 a./cm.$^2$ is suitale.

FIG. 14 shows uniting two metal parts together. In this example a voltage from a source $7'b$ is applied across two parts $1'c$ and $2c$ through a variable rector $8b$ to cause external current through the molten composition. In this case, as the parts $1'c$ and $2c$ serve as the electrodes when immersed in the molten composition, they should be spaced apart a suitable distance, for instance 1 to 2 mm. Of course in this case the molten composition is not necessarily current-heated, but other means such as the burner flame may be used for maintaining the bonding composition in a molten state.

In the previous two embodiments enough and sufficient energy is available from the part to be joined itself to ensure soldering with a short immersing time. Also the molten composition adjacent the immersed parts can be concentrically heated, so that rapid and reliable soldering can be effectively made. Further, short immersing time reduces overheating of the conductive parts to be joined together.

What is claimed is:

1. A method of bonding parts of members to be joined together by means of a glass composition, comprising the steps of:

(a) forming a pool of the glass composition in a molten condition;

(b) heating at least a layer of the glass composition at or near the surface of the pool so that said layer has a viscosity of less than 100 poises by passing an electric current through said layer between two electrodes disposed in the surface layer of the pool;

(c) immersing parts of said members to be joined in said layer between said two electrodes with edges of said parts in opposing relationship so as to cause electric current to pass through the immersed parts of said member in an amount of current sufficient to heat the immersed parts so that there is no decrease in temperature in the molten composition in the vicinity of the immersed parts, for an appropriate interval of time so as to cause adherence of molten glass to the immersed edges of said parts to bond them together; and (d) withdrawing said parts from the pool.

2. A method of bonding parts together according to claim 1 wherein at least one of the parts is metal and a voltage is applied between said metal part and one of the electrodes disposed in said upper layer of the molten composition to cause electric current to pass through said upper layer of the molten composition and through the immersed part of said members.

3. A method of bonding parts together according to claim 1 wherein said parts to be bonded together are more than two in number and of metal and at least two parts serve as the electrodes when immersed in the molten composition.

4. A method of bonding parts of members to be joined together by means of a glass composition, comprising the steps of:

(a) forming a pool of the glass composition in a molten condition;

(b) heating at least a layer of the glass composition at or near the surface of the pool by passing an electric current through said layer so that said layer has a viscosity of less than 100 poises;

(c) immersing parts of said members to be joined in said layer with the edges of said parts in opposing relationship so as to cause electric current to pass through the immersed parts of said members in an amount of current sufficient to heat the immersed parts so that there is no decrease in temperature in the molten composition in the vicinity of the immersed parts, for an appropriate interval of time so as to cause adherence of molten glass to the immersed edges of said parts; and (d) lifting up the immersed parts of said members above the surface of the molten composition while passing an electric current through said parts of said members in an amount sufficient to reduce the viscosity of that portion of the molten glass which has been suspended so as to cause its separation from the parent body of molten glass.

5. A method of bonding parts together according to claim 4 wherein heating is accomplished by two electrodes which are used to pass electric current through the surface layer wherein one of the electrodes disposed for heating the surface layer also serves as an electrode which may be withdrawn from the bath while contacting the parts to be joined.

References Cited

UNITED STATES PATENTS 2,552,395    5/1951    Borel et al. _____ 13—6

FOREIGN PATENTS 569,150    5/1945    Great Britain.
593,866    3/1960    Canada.

S. LEON BASHORE, Primary Examiner

S. R. FRIEDMAN, Assistant Examiner

U.S. Cl. X.R.

13—6; 29—472.9; 65—43, 59